United States Patent [19]

Clift

[11] Patent Number: 4,691,729
[45] Date of Patent: Sep. 8, 1987

[54] REVERSE-BUCKLING RUPTURE DISK WITH REPLACEABLE DISK AND BLADE

[76] Inventor: Miner E. Clift, P.O. Box 1327, Broken Arrow, Okla. 74012

[21] Appl. No.: 880,569

[22] Filed: Jun. 30, 1986

Related U.S. Application Data

[63] Continuation of Ser. No. 617,893, Jun. 6, 1984, abandoned.

[51] Int. Cl.[4] ............................................. F16K 17/14
[52] U.S. Cl. .................................. 137/68.1; 220/89 A
[58] Field of Search ..................... 137/68.1; 220/89 A

[56] References Cited

U.S. PATENT DOCUMENTS

| | | | |
|---|---|---|---|
| 2,661,121 | 12/1953 | Coffman | 220/89 A |
| 3,934,602 | 1/1976 | Muddiman | 137/68.1 |
| 4,236,648 | 12/1980 | Wood | 220/89 A |
| 4,252,528 | 3/1981 | Brodie | 137/68.1 X |
| 4,269,214 | 5/1981 | Forsythe | 220/89 A X |
| 4,301,938 | 11/1981 | Wood | 137/68.1 X |
| 4,363,418 | 12/1982 | Matz | 137/68.1 |
| 4,394,926 | 7/1983 | Ou | 137/68.1 X |
| 4,463,865 | 8/1984 | Mundt | 220/89 A |
| 4,479,587 | 10/1984 | Mundt | 137/68.1 X |

Primary Examiner—Harold W. Weakley
Attorney, Agent, or Firm—Pravel, Gambrell, Hewitt & Kimball

[57] ABSTRACT

A reverse-buckling rupture disk assembly provides a cylindrical housing having a bore for conveying flow through the housing. Removably mounted within the housing is a frangible concave-convex disk which is connected along its peripheral edge to the housing so as to form a closure to the bore. The housing can be disassembled and such disassembly allows removal and replacement of the disk. The disk is designed to resist pressure on the convex side up to a predetermined pressure and then collapsing after the predetermined pressure is reached. A knife blade is positioned within the housing bore on the concave side of the disk for perforating the disk when it collapses. The ends and center of the blade are removably connected to the inner surface of the housing so that the blade can be replaced after it wears or otherwise needs replacement. The knife blade is spaced from the inner surface of the housing at least along a substantial portion of its length. The knife blade can be serrated and is preferably curved.

5 Claims, 4 Drawing Figures

REVERSE-BUCKLING RUPTURE DISK WITH REPLACEABLE DISK AND BLADE

Reference to Related Application

This is a continuation of application Ser. No. 617,893 filed June 6, 1984 entitled "Reverse-Buckling Rupture Disk With Replaceable Disk And Blade," now abandoned.

This application relates to the subject matter of co-pending U.S. Ser. No. 510,568 filed July 5, 1983 entitled "Reverse-Buckling Rupture Disk," of which Miner E. Clift is a co-inventor.

BACKGROUND OF THE INVENTION

1. Technical Field:

The present invention relates to safety pressure relief devices and more particularly to rupture disks. Even more particularly, the present invention relates to reverse-buckling tupe rupture disks of the type using a reverse-buckling rupture disk in combination with a knife located downstream of the concave side of the rupture disk.

2. General Background:

Various rupture disks have been patented of the reverse-buckling type, which in combination with the disk use a cutting blade for severing the disk when the disk reverses and buckles in the presence of a design relief pressure. Notice, for example, recently issued U.S. Pat. No. 4,269,214 entitled "Safety Pressure Relief Valve" issued to Calvin C. Forsythe, John L. Strelow and Miner E. Clift, the latter being a co-inventor of the present application. In that application, there is discussed various prior reverse-buckling type rupture disks which have as part of the apparatus a cutting blade for severing a portion of the disk upon reversal. In the patent, there is provided a safety pressure relief device including a rupture disk having a concave-convex portion and a radially outer flange portion joined by a curved transition connection. A knife is located adjacent the concave side of the rupture disk, with the knife including a radially outer flange portion which supports the curved transition connection. A substantially circular inner opening is disposed within the knife. The knife includes first and second spaced cutters projecting radially inward into the opening and inclined toward the concave portion of the rupture disk. The knife further includes first and second arcuate non-cutting portions each partially defining an inner opening. The first cutting blade is located between the first and second non-cutting portions so that upon reversal of the rupture disk, the first and second cutting means will puncture the rupture disk without severing a portion of the disk therefrom.

Another safety pressure relief apparatus of the reverse-buckling type is U.S. Pat. No. 4,211,334 issued to John E. Witten, Loren E. Wood and Edward Short. That device provides a safety pressure relief apparatus having a reverse-buckling rupture disk which provides a concave-convex portion connected to an annular flat flange portion by a curved transition connection and a support member having an annular flat flange portion for engaging the annular flat flange portion of the rupture disk and for supporting the transition connection thereof. The support member includes a cutting edge positioned interiorly of the transition connection and forming an opening in the support member so that when the concave-convex portion of the rupture disk reverses itself, the cutting edge severs the disk whereby a portion thereof passes through the opening in the support member. A bar for catching the severed portion of the disk after it passes through the opening in the support member is attached to the support member.

Another reverse-buckling type rupture disk is seen in U.S. Pat. No. 3,908,684 issued to Edward Short. That device provides a rupture disk assembly of small integral construction comprising a substantially cylindrical housing having a reverse-buckling rupture disk supported therein. An annular top supporting member is positioned within the housing adjacent to the rupture disk, which includes an annular lip portion extending outwardly around the periphery thereof. The upper end portion of the housing is folded over the outwardly extending lip portion of the supporting member so that the lip portion is deformed downwardly thereby rigidly clamping the supporting member and rupture disk within the housing.

A low pressure rupture device is the subject of U.S. Pat. No. 4,119,236 issued to Kenneth R. Shaw and Franklin Hansen. That patent discloses a safe pressure relief assembly of the reverse acting rupture disk type which guards against very low pressure differentials and includes a thin, bulged sealing disk, a cutting member positioned in spaced relation to the sealing disk and extending a substantial transverse distance thereacross and a sealing disk support member having a stay arrangement projecting into support engagement with the concave side of the sealing disk, the stay arrangement having a resistance to collapse sufficient to retain the sealing disk out of contact with the cutting member only up to a predetermined differential pressure.

A precise, reverse acting, frangible disk pressure device is the subject of U.S. Pat. No. 3,685,686 issued to John H. Raidl. That device uses a frangible member sub-assembly having a pre-bulged frangible disk with its annular flange secured between first and second seating rings. The frangible disk sub-assembly and a co-acting knife blade sub-assembly are mounted in annular grooves on the mating faces of flanges. A particular feature is the supporting of the downstream disk seating ring against an annular seat on the knife blade sub-assembly so that the device will not seal against pressure in the event the knife blade sub-assembly is inadvertently omitted.

U.S. Pat. No. 3,693,691 entitled "Pressure Relief Device" was issued Sept. 26, 1972 to Stanley Summers. That device provides a device particularly suited for use with aircraft wheels or similar wheel bearing tires which are inflated with a gas from a source that is at a pressure that exceeds the safety limits of the wheel.

Many of the above devices require complex manufacturing as they include a number of complex interconnecting parts, ridges, shoulders, and the like. These devices are highly complex, expensive to manufacture and to machine and are generally costly. Further, many of these devices provide cutting blades which can, in fact, support the disk during reverse-buckling rather than cut the disk, causing malfunction. For exaple, many of the knife blades used in such reverse-buckling disks are a plurality of knife blades which, upon reversal, cut the disk into radial sections such as quarters. Some of these knife blades require finely honed edges in order to function properly. Corrosion, for example, can severely limit proper operation of such a rupture disk. Another problem with rupture disks is the problem of a full opening of the disk upon rupture. This problem can be particularly acute at low pressures. Another problem of some reverse buckling knife type rupture disks is the problem of reusing portions of the disk such as the knife and/or disk. Many existing rupture disk devices are permanent assemblies which are "throw-away" after one use.

GENERAL DISCUSSION OF THE PRESENT INVENTION

The present invention provides a rupture disk assembly of the reverse-buckling, knife blade type. A housing defines a bore for conveying flow. A frangible, concave-convex disk is supported at its edge portions by the housing so that the bore is closed by the disk. The disk resists pressure on the convex side until a pre-determined pressure is reached. An elongated knife blade having two end portions is positioned within the bore on the concave side of the disk. The ends and center of the knife blade are removably attached to the inner surface of the housing. Both ends are preferably attached to the housing at the lateral center line of the bore. This connection is preferably at two separate positions on the housing inner surface and spaced downstream of the disk so that the knife never touches the disk until disk reversal, eliminating the possibility of damaging the disk during installation. The knife blade can be generally U-shaped when viewed longitudinally along the bore axis. A plurality of teeth with sharp cutting edges are preferably disposed along the edge of the knife blade which faces the disk so that when the disk reverses, it contacts the blade and is cut.

It is the object of this invention to provide a knife blade which is simple and inexpensive to manufacture, and which can be replaced separatelyn from the fupture disk without damage to the rupture disk. Additionally, it is the object of this invention to provide a knife blade which does not touch, support or connect to the rupture disk prior to deformation of the rupture disk and which allows full opening of the disk at acute low pressures. These objects lead to a knife in which the degree of sharpness of the knife is not as critical a factor in supporting the disk as on the prior art. This allows the knife blade to be used through several cycles of disk rupture.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PRESENT INVENTION

Figure 1:
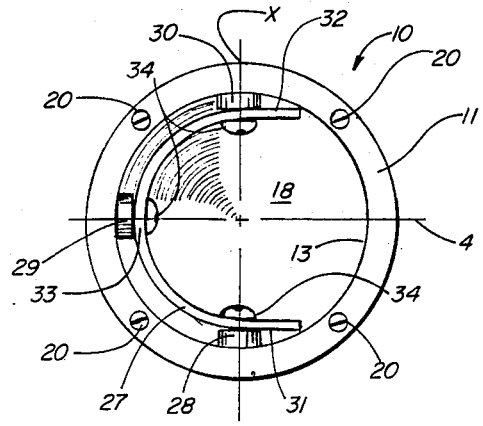
FIG. 1 is a top view of the preferred embodiment of the apparatus of the present invention.
Figure 2:
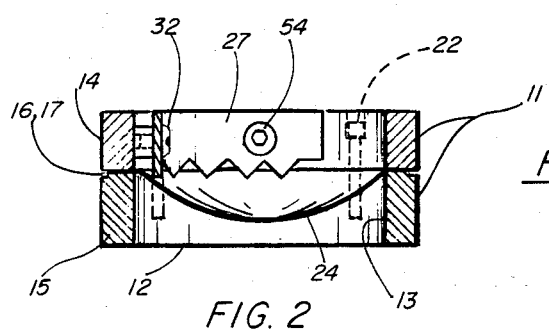
FIG. 2 is a sectional view taken along lines 2—2 of FIG. 1.

FIGS. 1-4 illustrate the preferred embodiment of the apparatus of the present invention designated generally by the numeral 10.

Reverse-buckling rupture disk 10 comprises an annular preferably cylindrical housing 11 having an inner bore 12 for conveying flow, defined by interior wall 13 of housing 11. Housing 11 provides a p ir of annular wall sections 14, 15 which are joined at surfaces 16, 17. A rupture disk 18 of the frangible, reverse-buckling type is provided with its annular edge being a flange 19 which is sandwiched between sections 14, 15 upon assembly. Disk 18 could be, for example, of thin metallic construction such as stainless steel. Each housing section 14, 15 can have bolt openings 20, 21 through which assembly bolts 22 can pass. Openings 21 can be threaded so that they can be engaged by the threads of bolts 22. Corresponding openings 23 can be formed in the flange 19 of disk 18. When housing sections 14, 15 are assembled and bolts 22 connected through openings 20, 23 and 21, all three elements including section 14, disk 18 and section 15 can be held together by weld 16, 17. Alternately, annular wall sections 14, 15 can be preliminarily secured together in the position shown in FIG. 2 by means of pre-assembly lugs attached to the exterior wall of each section 14, 15, and clamping force supplied by a pair of bolted together companion flanges (not shown) is used to hold the two sections 14, 15 together during operation. Such bolted companion flanges are commonly used to hold rupture disks in operating positions of piping systems, vessels and the like.

Reverse-buckling rupture disk 18 includes a convex surface 24 and a concave surface 25. Arrows 26 in FIG. 3 illustrate the direction of flow through bore 12.

Mounted downstream of concave face 25 of reverse-buckling disk 25 is knife blade assembly 27. Knife blade assembly 27 is generally curved and elongated, having a U-shape, the blade being attached at three positions by connections 28, 29 and 30 to the inner surface 13 of housing 11. The end portions 31, 32 of blade 27 are preferably connected to the inner surface 13 of the housing bore 12 with connections 28, 30 at a lateral center line of the bore 12 designated as "X" (see FIG. 1). The blade center portion is connected with connection 29 to the housing 11 at axis Y which intersects the lateral centerline X at right angles. This three position mount of the blade to the housing comprises removable connections 28, 29, and 30, each including mounting bolts 34 which threadably attach to respective internally threaded bushings 35. Each bushing 35 provides an internally threaded bore 36 (see FIG. 4) which can threadably engage a mounting bolt 34. The blade 27 has openings 37 through which bolts 34 can pass.

Figure 3:
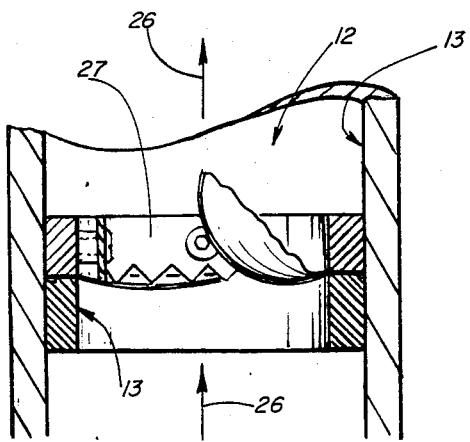
FIG. 3 is a sectional view of the preferred embodiment of the apparatus of the present invention illustrating operation of the device.
Figure 4:
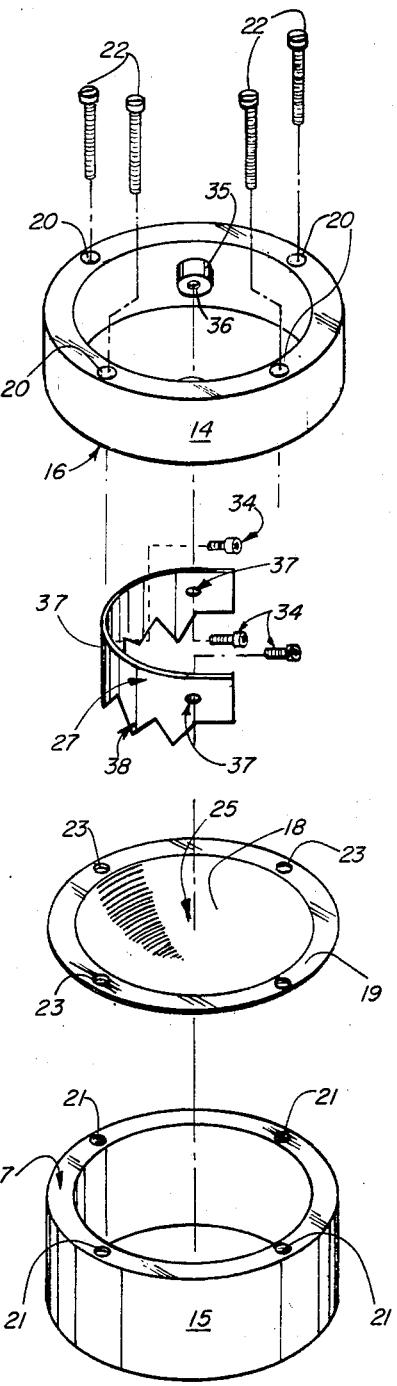
FIG. 4 is an exploded disassembled view of the preferred embodiment of the apparatus of the present invention.

In FIG. 3, disk 18 is shown after rupture, having reversed and buckled and having been cut by blade 27. This releases pressure from a vessel with which the disk assembly 10 is being used. Flow to relieve pressure can then exit the vessel, leaving through bore 12 of housing 11 as shown by arrow 26. Blade ends 31, 32 preferably connect to surface 13 at different points around the inner surface 13 of housing 11.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A rupture disk assembly comprising:
   a. housing means defining a bore for conveying flow and comprising a pair of abutting annular sections;
   b. a frangible concave-convex disk supported at its edge portions between the annular sections, closing the bore, the disk being designed to resist pressure on the convex side up to a predetermined pressure and then collapsing after the predetermined pressure is reached;

c. means for temporarily assembling the annular sections and disk together so that the disk can be removed after rupturing and replaced with another disk; and d. an elongated U-shaped knife blade with two ends positioned within the bore on the concave side of the disk and spaced downstream therefrom, the blade comprising a flat blade body with an upstream leading edge and a downstream trailing edge that are spaced from the wall of the bore and a plurality of teeth lining the leading edge for perforating the disk when it collapses, the ends of the blade being connected to the inner surface of the housing means on one side of the lateral centerline of the bore and wherein the knife blade is removably connected to the housing means so that it can be replaced independently of the disk.

2. The disk of claim 1, wherein the ends of the knife blade are connected at different points around the inner surface of one of the annular sections.

3. The disk of claim 2, wherein the knife blade is U-shaped and extends across the lateral center line toward the opposite surface of the bore from where the ends are connected.

4. The disk of claim 1, wherein the knife blade is removably connected to one of the annular sections with a plurality of spaced removable connections.

5. A rupture disk assembly, comprising:

a. housing means with a bore for conveying flow therethrough;

b. a frangible concave-convex disk connected along its peripheral edge to the housing means, closing the bore, the disk being designed to resist pressure on the convex side up to a predetermined pressure and then collapsing after the predetermined pressure is reached; and c. an elongated U-shaped knife blade with two ends positioned within the bore on the concave side of the disk and spaced downstream therefrom, the blade comprising a flat blade body with an upstream leading edge and a downstream trailing edge that are spaced from the wall of the bore and a plurality of teeth lining the leading edge for perforating the disk when it collapses, at least the end portions of the blade being removably connected to the housing means at the lateral center line of the bore.

* * * * *